Dec. 9, 1958 A. L. STECK ET AL 2,863,381
WARE DECORATING MACHINE
Filed Jan. 13, 1953 4 Sheets-Sheet 2
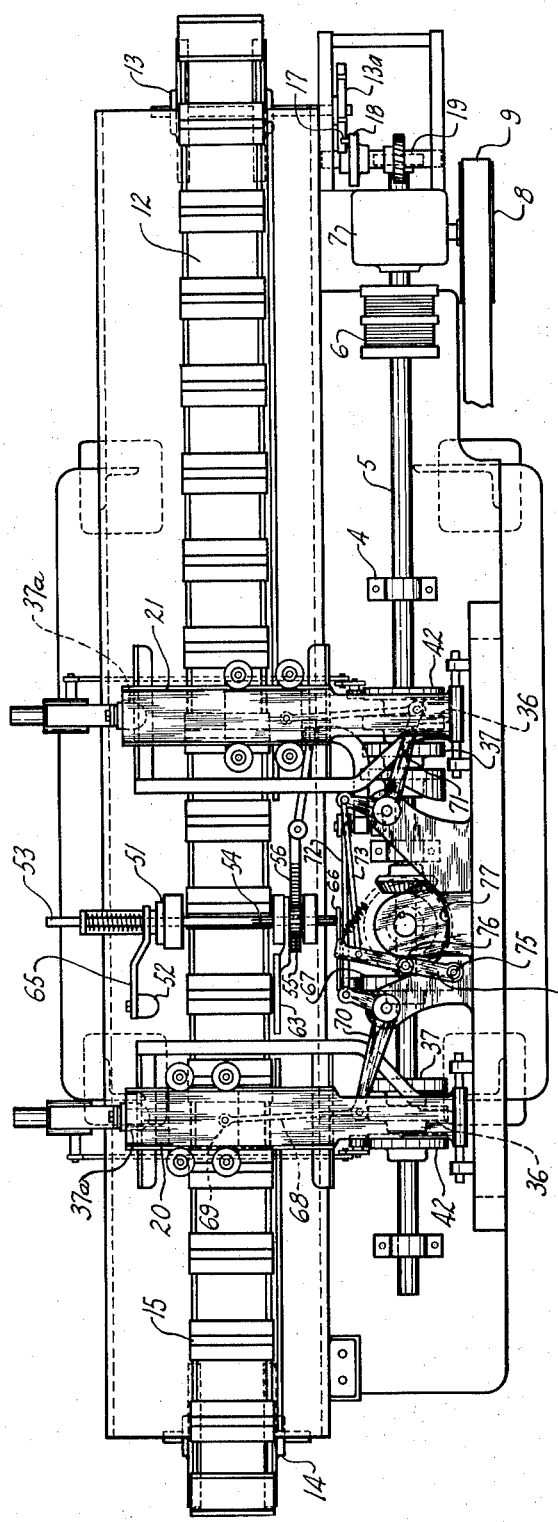
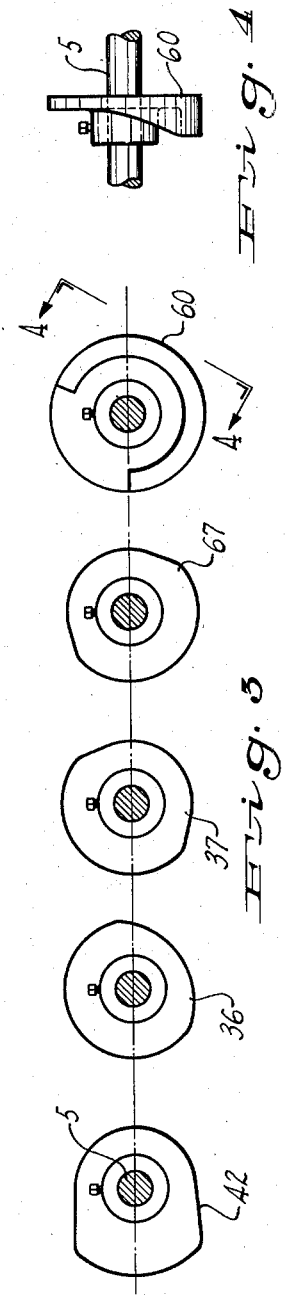
INVENTOR.
Arch L. Steck
BY and Maurice E. Huth
William B. Jaspert
Attorney.

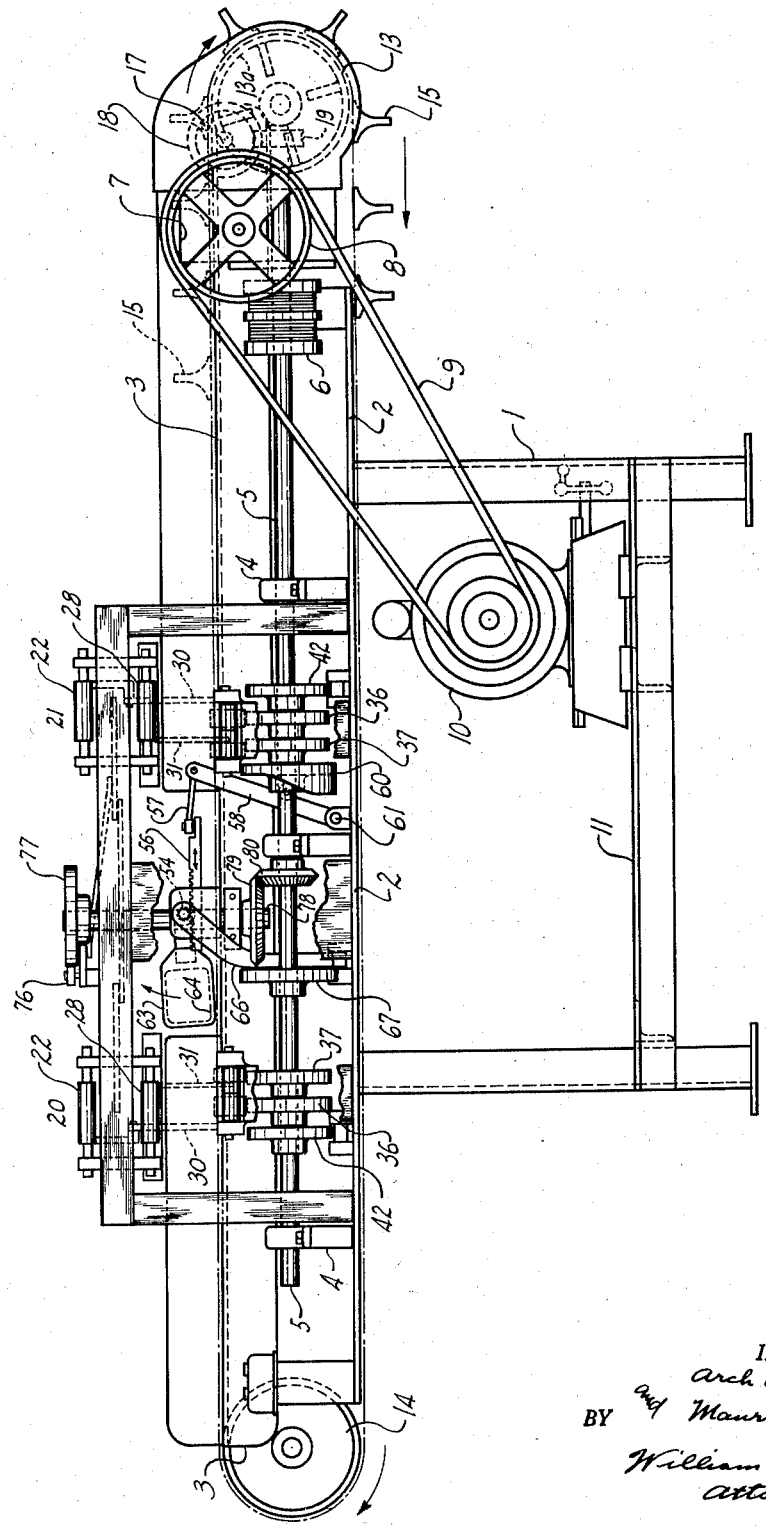

Dec. 9, 1958  A. L. STECK ET AL  2,863,381
WARE DECORATING MACHINE
Filed Jan. 13, 1953  4 Sheets-Sheet 3

INVENTOR.
Arch L. Steck
BY Maurice E. Huth
William B. Jaspert
Attorney.

United States Patent Office 2,863,381
Patented Dec. 9, 1958

2,863,381

WARE DECORATING MACHINE

Arch L. Steck and Maurice E. Huth, Oil City, Pa., assignors, by mesne assignments, of one-half to said Steck and one-half to Knox Glass Bottle Company, Knox, Pa., a corporation of Pennsylvania Application January 13, 1953, Serial No. 330,987

1 Claim. (Cl. 101—123)

This invention relates to new and useful improvements in decorating machines for supplying ceramic labels to glass ware such as milk bottles or other glass containers, and the present invention is especially adapted for supplying such labels to opposite sides of the containers by a single pass of the container through the decorating machine.

It is among the objects of this invention to provide a decorating machine in which glass containers are conveyed below a pair of spaced decorating screens and which is provided with means for gripping the container after it has passed from one decorating station to raise it from the conveyor and turn it 180 degrees, or at any desired angle, and return it to the conveyor before it passes beneath a second decorating station.

Figure 6:
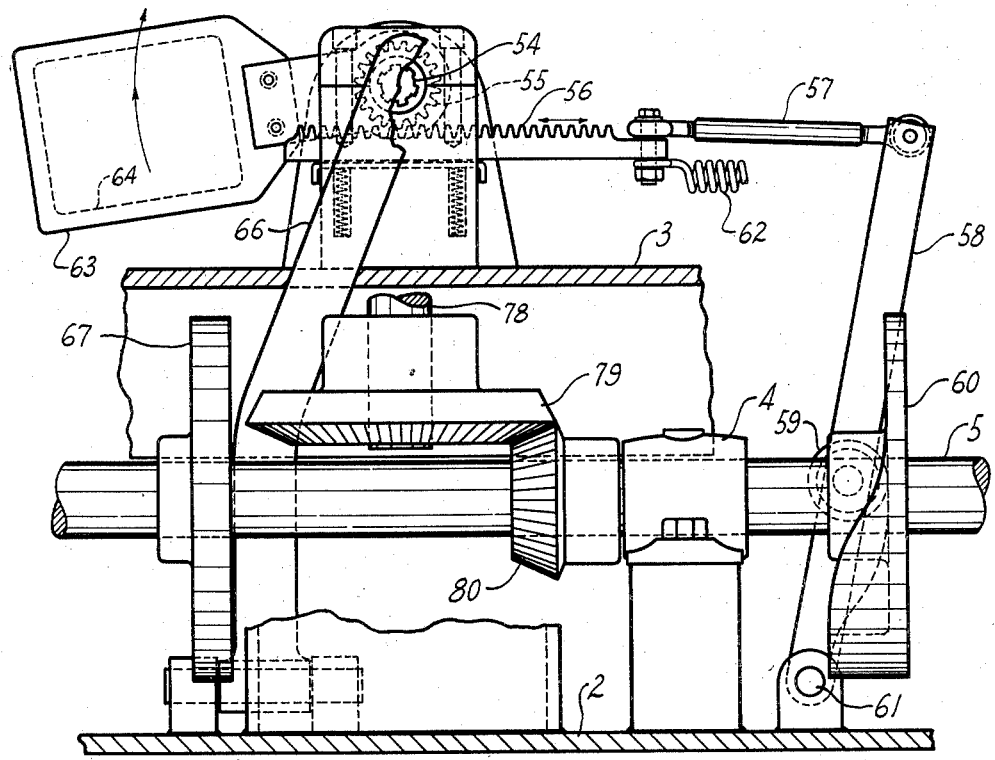
Figure 5:
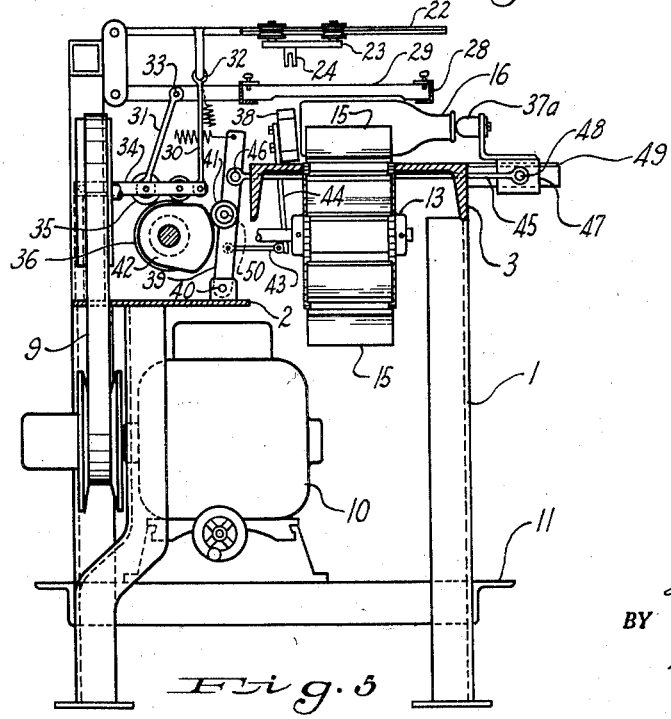
Figure 7:
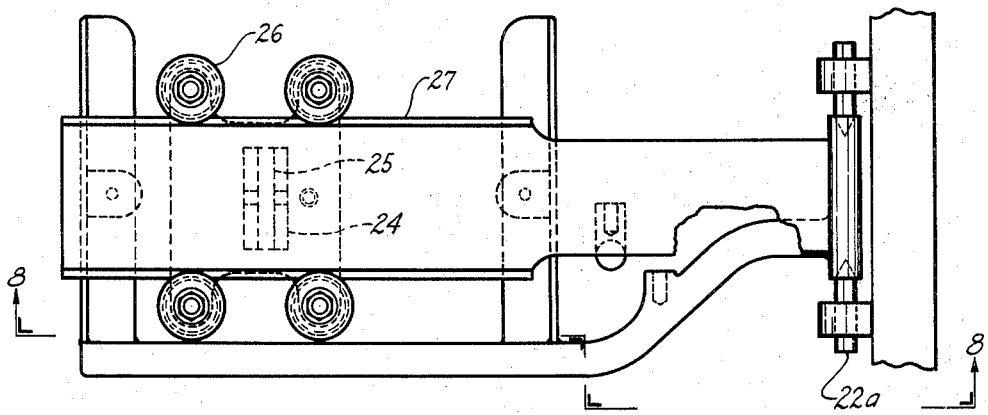
Figure 8:
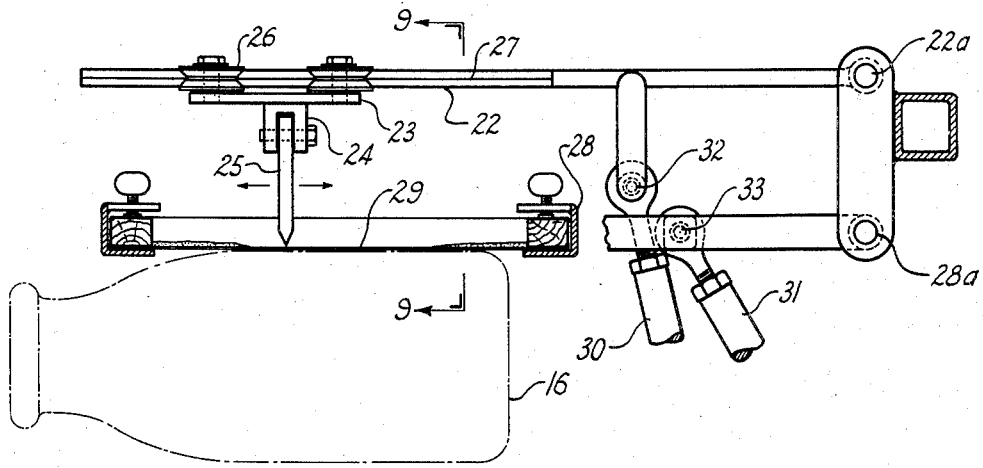
Figure 9:
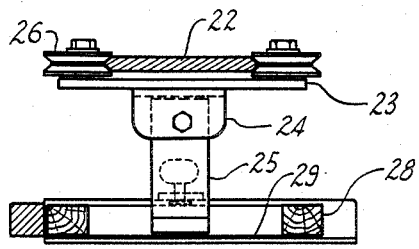

These and other objects of the invention will become more apparent from a consideration of the accompanying drawings constituting a part hereof in which like reference characters designate like parts and in which Fig. 1 is a rear elevational view of a decorating machine embodying the principles of this invention, Fig. 2 is a top plan view thereof, Fig. 3 a series of front elevational views partially in section of cams employed in the operation of the moving parts of the machine shown in Figs. 1 and 2, Fig. 4 a front elevational view of the cam shown in Fig. 3 taken along the line 4—4 of Fig. 3, Fig. 5 an end elevation partially in section of the machine shown in Figs. 1 and 2, Fig. 6 an enlarged detail partially in section and partially in illustration of the drive shaft and the bottle transfer mechanism, Fig. 7 a top plan view of the squeegee mount, Fig. 8 a side elevational view partially in section of the screen and squeegee and a portion of the operating mechanism therefor, taken along the line 8—8, Fig. 7, and Fig. 9 a vertical section showing the squeegee and elevation taken along the line 9—9 of Fig. 8.

With reference to Fig. 1 of the drawings, the numeral 1 designates a stand that constitutes the machine frame on which is supported a plate 2 and an inverted channel 3 as shown in Fig. 5. Mounted on the plate 2 are a series of bearings 4 for journalling a drive shaft 5 that is connected by a coupling 6 to a gear box 7 having a drive wheel 8 connected by a belt 9 to a motor 10 mounted on a cross angle 11 of the frame 1. An endless conveyor 12, Fig. 2, passes over end drums 13 and 14 and is provided with lugs 15 that are spaced to engage the ware to be decorated such as the bottle 16 shown in Figs. 5 and 8, these bottles being square bottles to which a ceramic label is applied on diametrically opposed sides. The drum 13 is the drive drum for the conveyor and is provided with a Geneva wheel 13a that is engaged by a drive pin 17 on the drive wheel 18 that is worm driven at 19 from the shaft of the gear box 7 so that the conveyor belt will move intermittently between the color application stations which are generally designated by the numerals 20 and 21, Figs. 1 and 2, the drive for the conveyor being more clearly shown in Fig. 2 of the drawings.

The arrangement of the color screen and squeegee mechanism in relation to the bottle and the bottle chucking mechanism is more clearly shown in Fig. 5 in which numeral 22 designates the squeegee frame on which is mounted a carriage 23 with the clamp 24 that holds the squeegee which is a rubber strip designated by the numeral 25 in Figs. 8 and 9. A squeegee carriage 22 is provided with wheels 26 that ride on a track 27 of the frame 22. Below the frame 22 is the screen frame 28 on which is clamped the screen 29 containing the design of the label that is printed on the bottle 16 when the tip of the squeegee 25 passes over the screen as shown in Fig. 8 of the drawing. Color of suitable ceramic qualities is maintained in the screen and is forced through the perforations of the screen when the squeegee passes back and forth. Both the squeegee frame 22 and the screen frame 28 are raised and lowered on pivots 22a and 28a when the bottle 16 is moved in to and out of position with the screen 28. To this end links 30 and 31 are provided which are pivotally connected at 32 and 33, respectively, to the frames 22 and 28. Links 30 and 31 are mounted on separate levers such as the lever 34, Fig. 5, carrying cam followers 35 and engage cams 36 and 37 shown in Figs. 1, 2, and 3. Bottles 16, when passing under the squeegee 28, are what may be termed chucked by means of a plunger 37a and a receptacle 38, Fig. 3, that are operated by a common lever 39 pivoted at 40 to the steel plate 2 of the frame. Lever 39 is provided with a follower 41 that engages cam 42. Lever 39 is connected by a link 43 to an arm 44 pivoted on the inverted frame channel 3 that carries the base receptacle 38 that engages the base of the bottle 16 and a link 45 is pivoted to lever 39 at 46 and to a slide 47 at 48, the slide 47 being operable on a guide 49 and carries the plunger 37a that engages the finish or neck of the bottle 16.

Lever 39 carries a lug on the side opposite the cam follower 41 which is in the path of the arm 34 when the cam follower 41 is on the low side of cam 42. This lug, shown in dotted lines at 50, Fig. 5, prevents the lever 34 from moving downward so that the squeegee frame is kept in its out of contact position to prevent operation of the squeegee when no bottle is present below the screen.

It will be noted from Figs. 1 and 2 that there are duplicate cams and duplicate screening stations and disposed therebetween is a bottle lifting mechanism generally designated by the numeral 51 which is more clearly shown in Fig. 6 of the drawing. It consists of a plunger 52 mounted on a spline shaft 53 having splines 54 that engage a complementary shaped socket of a gear wheel 55 having inter-acting teeth with a gear rack 56 that is operated by a link connection 57 with lever 58 having a cam follower 59 that engages the cam 60, lever 58 being pivoted at 61 to a lug on the plate 2. A coil spring 62, Fig. 6, is connected to the rack 56 and to the machine frame to bias lever 56 in the direction to maintain contact of the follower 59 with the face of cam 60. Spline shaft 54 carries a base plate 63 that may be recessed as shown at 64 to the shape of the base of bottle 16, which in the illustration is a square milk bottle. The base member 63 together with the plunger 52 swings through an arc when gear wheel 55 is rotated by the rack 56 in response to the action of cam 60, the particular cam shown in Fig. 6 of the drawing being designed to turn the spline shaft 54 one-half a revolution which subjects the plunger 52 and base 63 to swinging movement through an arc of 180 degrees. The plunger element 52 is fixed to spline shaft 53 by an arm 65 and the spline shaft 53 is movable axially by means of a lever 66, Fig. 2 that engages the end of the spline shaft 53, plate 66 being movable to displace the spline shaft 53 through a cam 67, also shown in Fig. 3 of the drawing. The cams are so arranged on the cam shaft that spline shaft 53 is displaced in an axial direction to move the plunger 52 into the bottle neck when the plunger and base plate 63 are in the position shown in Fig. 2. The gear rack then operates to turn the spline shaft which causes the plunger 52 and base 63 to lift the bottle 16 out of the conveyor lugs 15 and swing it 180 degrees and lower it into the space between another set of lugs after which the lever 66 displaces spline shaft 53 to release the plunger 52 from the bottle neck and the bottle moves into the second screening station designated 21, Fig. 2 of the drawings, to have another label applied on the face of the bottle opposite that to which the color was applied at the first screening station designated by the numeral 20, Fig. 2.

As also appears from Fig. 2 of the drawing, the squeegee carriages 23 are moved on their tracks by links 68 pivoted to the carriage 23 at 69 and pivoted at their other ends to levers 70 and 71, the levers being interconnected by a link 72, to render them simultaneously operable. Levers 70 and 71 are bell crank levers and lever 71 is connected by a link 73 to a lever 74 pivoted at 75 to the machine frame and provided with a follower 76 that engages cam 77 that is driven by a shaft 78, Fig. 6, through a bevel gear 79 connected to a pinion 80 mounted on the cam or drive shaft 5. By direct gearing connection of cam 77 with the cam shaft 5, the movement of the squeegee carriages is synchronized with the raising and lowering movements of the squeegee frame 22 and the screen frame 28.

The operation of the above described mechanism is briefly as follows. Assuming the conveyor movement to be from left to right as viewed in Figs. 1 and 2 of the drawings, the bottles are placed in the spaces between the lugs 15 with the neck portion towards the front of the machine which is at the top of Fig. 2 and on the right hand side of Fig. 5. As the conveyor moves forward in steps by the Geneva wheel drive 13a, it will come in alignment with the plunger 37 of the screening station 20. By means of the heretofore described cam action, the screen frame 28 will be lowered to make contact with the bottle and the squeegee frame will lower so that the squeegee 25 will contact the screen 29. Squeegee carriage 23 is then moved by link 68, Fig. 2 to rub the squeegee over the screen 29 and displace the color through the label design on to the surface of the milk bottle. The squeegee and screen frames 22 and 28 will then be lifted by their respective cams and the bottle will move towards the right to the space in alignment with the turn-over plunger 52 which engages the bottle to force it against the base 63, and gear rack 56 will cause the arms 65 and 63 to swing with the spline shaft 53, 180° and deposit the bottle on the conveyor with the printed label down. The bottle then passes under the screen of the second station 21, Fig. 1, and the screen and squeegee frames are lowered to produce the squeegee action on the screen that will print the second label on the bottle opposite the first label. The second label may be of a different design and indicia than the first or it may be the same as the label first applied to the bottle. Upon the next indexing movement of the conveyor the bottle is freed and may be removed from the conveyor for further treatment.

It is evident from the foregoing description of this invention that labeling machines made in accordance therewith are of simple and rugged mechanical construction and operable to apply ceramic labels on opposite sides or at angularly spaced intervals on the ware to be decorated, whether such be bottles or other kinds of containers.

Although one embodiment of the invention has been herein illustrated and described, it will be evident to those skilled in the art that various modifications may be made in the details of construction without departing from the principles herein set forth.

We claim:

In a color screen labeling apparatus an endless chain conveyor movable in a horizontal plane having spaced lugs constituting cradles for receiving ware to be decorated, drive mechanism for moving said conveyor intermittently in increments corresponding to the spacing of said lugs, a plurality of decorating stations in the path of movement of said conveyor each consisting of a label screen and a squeegee for displacing color through the screen to the surface of the ware, a chucking device for engaging the ware below the screen, said chucking device, screen and squeegee actuated in timed relation with the movements of the conveyor, and means between the decorating stations for engaging the ware after it is labeled on one side, raising the same from the conveyor and turning it to expose an unlabeled surface while depositing it on the conveyor for receiving color as it passes underneath the succeeding decorating stations, said means consisting of a plurality of arms having gripping means for engaging opposite ends of the ware, one of said arms being movable in a direction axially of the ware and said arms being mounted on a rocker shaft with means for actuating the shaft to swing the arms through an angle of 180 degrees.

References Cited in the file of this patent

UNITED STATES PATENTS

| | | |
|---|---|---|
| 1,401,429 | Moome | Dec. 27, 1921 |
| 1,594,326 | Richter | July 27, 1926 |
| 2,061,679 | Simonton | Nov. 24, 1936 |
| 2,121,491 | Soubier | June 21, 1938 |
| 2,231,553 | Soubier | Feb. 11, 1941 |
| 2,256,490 | Paynter | Sept. 23, 1941 |
| 2,553,085 | Groce | May 15, 1951 |
| 2,664,992 | Bahney | Jan. 5, 1954 |
| 2,690,118 | Schwartz et al. | Sept. 28, 1954 |